United States Patent
Yu

(10) Patent No.: US 8,073,913 B2
(45) Date of Patent: Dec. 6, 2011

(54) METHOD FOR PUSHING EMAIL IN HETEROGENEOUS NETWORKS, MOBILE TERMINAL AND SERVER

(75) Inventor: Chentao Yu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 815 days.

(21) Appl. No.: 11/853,175

(22) Filed: Sep. 11, 2007

(65) Prior Publication Data

US 2008/0065734 A1    Mar. 13, 2008

(30) Foreign Application Priority Data

Sep. 11, 2006    (CN) .......................... 2006 1 0126974

(51) Int. Cl.
- *G06F 15/16* (2006.01)
- *G06F 11/00* (2006.01)
- *H04W 4/00* (2009.01)
- *H04B 1/00* (2006.01)
- *H04B 7/00* (2006.01)

(52) U.S. Cl. ........ 709/206; 709/205; 709/207; 709/208; 370/231; 370/252; 370/329; 455/69; 455/522; 455/442

(58) Field of Classification Search .................... None
See application file for complete search history.

(56) References Cited

U.S. PATENT DOCUMENTS

| | | | | |
|---|---|---|---|---|
| 4,926,415 | A * | 5/1990 | Tawara et al. ................. | 370/231 |
| 5,625,892 | A * | 4/1997 | Bauman et al. ................. | 455/69 |
| 6,499,055 | B1 * | 12/2002 | Yamaguchi .................... | 709/206 |
| 2002/0169954 | A1 * | 11/2002 | Bandini et al. ................ | 713/153 |
| 2003/0064744 | A1 * | 4/2003 | Zhang et al. .................. | 455/522 |
| 2004/0054886 | A1 * | 3/2004 | Dickinson et al. ............. | 713/153 |
| 2004/0253955 | A1 * | 12/2004 | Love et al. .................... | 455/442 |
| 2005/0193145 | A1 * | 9/2005 | Brown et al. .................. | 709/238 |
| 2006/0111086 | A1 | 5/2006 | Wilson et al. | |
| 2007/0005983 | A1 * | 1/2007 | Dickinson et al. ............. | 713/176 |
| 2007/0027805 | A1 * | 2/2007 | Graves ........................... | 705/40 |
| 2007/0124390 | A1 * | 5/2007 | Sivakumar et al. ........... | 709/206 |
| 2007/0162582 | A1 * | 7/2007 | Belali et al. ................... | 709/223 |
| 2007/0260691 | A1 * | 11/2007 | Kallqvist et al. .............. | 709/206 |
| 2007/0270145 | A1 | 11/2007 | Feng et al. | |
| 2008/0062246 | A1 * | 3/2008 | Woodworth et al. ....... | 348/14.01 |
| 2008/0062881 | A1 * | 3/2008 | Martin et al. ................. | 370/238 |
| 2008/0126300 | A1 * | 5/2008 | Boss et al. ..................... | 707/3 |

FOREIGN PATENT DOCUMENTS

| | | |
|---|---|---|
| CN | 1549634 A | 11/2004 |
| CN | 1761246 A | 4/2006 |
| EP | 1 259 036 A1 | 11/2002 |

* cited by examiner

*Primary Examiner* — Hussein Elchanti
*Assistant Examiner* — Ho Shiu
(74) *Attorney, Agent, or Firm* — Dickstein Shapiro LLP

(57) ABSTRACT

A method for pushing email in heterogeneous networks as well as a mobile terminal and a server are disclosed. The method comprise steps of: sending a mail notification including at least mail priority and mail size of the email from a mail-pushing server to a mobile terminal; determining, by the mobile terminal, a download strategy for the email based on at least one predefined threshold, said mail priority and said mail size; and downloading said email from the mail-pushing server based on the determined download strategy. With the above solutions, it is possible to seamlessly integrate the long standby duration in the WAN mode with free-of-charge and high speed in the LAN mode and thus give a full play to these advantages. Moreover, the mobile terminal can select automatically the most suitable mail access strategy based on network condition and mail size for the simultaneous realization of effective power saving and efficient transmission.

13 Claims, 2 Drawing Sheets

METHOD FOR PUSHING EMAIL IN HETEROGENEOUS NETWORKS, MOBILE TERMINAL AND SERVER

BACKGROUND OF THE INVENTION

1. Field of Invention

The present invention relates to the optimized email transmission, and particularly to a method for pushing email in heterogeneous networks as well as a mobile terminal and a mail-pushing server utilizing the method.

2. Description of Prior Art

With the advancement of mobile communication technology, a mobile terminal is currently equipped with multiple network interfaces and thus the capability of simultaneously accessing several kinds of networks, such as Bluetooth, WIFI and GPRS. Although the data transmission rate is high in the mode of WIFI, for a mobile device, the operating distance is limited and the standby power consumption is rather large. Consequently, the mobile device in such mode cannot live up to the service requirements of long-term standby for mobile mail and waiting for new mail notification. For example, with WIFI function enabled, HP iPaq can be on standby for only 2 to 3 hours before it runs out of the power. In addition, the standby status can last less than 24 hours for the WIFI mobile phone from CISCO. On the other hand, the technologies such as GPRS, EVDO and 3G provide a long-distance network access capability and give better solutions for the standby annoyance to a mobile device. Due to the limitation on frequency bandwidth and terminal performance, however, the data transmission rate is relatively low, in particular, far lower than that achievable by a WIFI-enabled device.

In order to overcome the standby problem with the WIFI-enabled device, some solutions have been proposed, such as Power-Save Extension Protocol by Wi-Fi Multimedia and APSD (Automative Power-Save Delivery) by Atheros. All of these schemes require that wireless access points and terminals be modified to support more complex power-saving management protocols, for the purpose of a better power-saving effect. Moreover, even if these protocols are added, the standby duration for WIFI can be extended from several hours to less than 20 hours, which lags far behind the requirements of 7*24 hours corporate mail service.

Currently, various corporate email-pushing schemes are all implemented over WAN (Wide Area Network) such as GPRS/CDMA. Therefore, it is difficult to make full use of the characteristics of heterogeneous networks in selecting a cheap and rapid WIFI for network access, even with the wide popularity of WIFI access environment. Meanwhile, a proprietary WIFI mail client end suffers from certain power management strategy, leading to a scheme of short standby duration and poor applicability.

SUMMARY OF THE INVENTION

In view of the above problems, the present invention is proposed. It is an object of the invention is to provide a method for pushing email in heterogeneous networks as well as related mobile terminal and mail-pushing server so as to provide for users an optimized email transmission service.

In one aspect of the present invention, a method for pushing email in heterogeneous networks is provided comprising steps of: sending a mail notification including at least mail priority and mail size of the email from a mail-pushing server to a mobile terminal; determining, by the mobile terminal, a download strategy for the email based on at least one predefined threshold, the mail priority and the mail size; and downloading the email from the mail-pushing server based on the determined download strategy.

According to an embodiment of the present invention, the step of determining further comprises: comparing the mail size with a first predefined threshold if the mail priority is low; determining to download the email via a first network interface if the mail size is larger than the first predefined threshold; and determining to download the email via a second network interface if the mail size is not larger than the first predefined threshold.

According to an embodiment of the present invention, the step of determining further comprises: comparing the mail size with a second predefined threshold if the mail priority is high; determining to download the email via the second network interface if the mail size is larger than the second predefined threshold; and determining to download the email via the first network interface if the mail size is not larger than the second predefined threshold.

According to an embodiment of the present invention, the method further comprises step of updating the first predefined threshold and/or the second predefined threshold based on the actual characteristics of network transmission.

According to an embodiment of the present invention, the step of updating further comprises: determining the actual unit transmission power consumption of each network interface based on the actual transmission rate and actual packet loss ratio of the corresponding network interface; updating the first predefined threshold and/or the second predefined threshold based on the actual unit transmission power consumption, the actual transmission rate and authentication overhead of each network interface.

According to an embodiment of the present invention, the mail notification further includes mail-pushing manner and mail type.

According to an embodiment of the present invention, the first network interface is a WAN interface, and the second network interface is a LAN (Local Area Network) interface.

According to an embodiment of the present invention, the WAN interface is GPRS, CDMA, EDGE, WCDMA, CDMA2000, or TD-SCDMA interface, and the LAN interface is wired LAN, WIFI, WIMAX, Bluetooth or UWB interface.

According to an embodiment of the present invention, the WAN interface is usually opened, while the LAN interface is usually closed.

In another aspect of the present invention, a mail-pushing server is provided comprising: communication means for establishing connection with a first network and a second network via a first network interface and a second network interface; notification means for sending a mail notification including at least mail priority and mail size to a mobile terminal upon arrival of new email; transmission means for receiving a mail transmission command from the mobile terminal via the communication means and transmitting the email via the network indicated by the command.

In another aspect of the present invention, a mobile terminal is provided comprising: network access means having at least two network interfaces for accessing at least two types of networks; link metric means for calculating the unit transmission power consumption, authentication overhead and network transmission efficiency of the network accessed by the network access means; service schedule means for calculating at least one predefined threshold based on the unit transmission power consumption, authentication overhead and network transmission efficiency; mail check means for receiving a mail notification including at least mail priority and mail size from a mail-pushing server, where the service schedule means determines a download strategy for the email based on the mail priority, the mail size and the at least one predefined threshold and downloads the email based on the download strategy.

According to an embodiment of the present invention, the service schedule means compares the mail size with a first predefined threshold if the mail priority is low, determines to download the email via a first network interface if the mail size is larger than the first predefined threshold, and determines to download the email via a second network interface if the mail size is not larger than the first predefined threshold.

According to an embodiment of the present invention, the service schedule means compares the mail size with a second predefined threshold if the mail priority is high, determines to download the email via the second network interface if the mail size is larger than the second predefined threshold, and determines to download the email via the first network interface if the mail size is not larger than the second predefined threshold.

According to an embodiment of the present invention, the service schedule means updates the first predefined threshold and/or the second predefined threshold based on the actual characteristics of network transmission.

According to an embodiment of the present invention, the link metric means determines the actual unit transmission power consumption of each network interface based on the actual transmission rate and actual packet loss ratio of the corresponding network interface, and the service schedule means updates the first predefined threshold and/or the second predefined threshold based on the actual unit transmission power consumption, the actual transmission rate and authentication overhead of each network interface.

With the above solutions, it is possible to seamlessly integrate the long standby duration in the WAN mode with free-of-charge and high speed in the LAN mode and thus give a full play to these advantages. Moreover, the mobile terminal can select automatically the most suitable mail access strategy based on network condition and mail size for the simultaneous realization of effective power saving and efficient transmission.

BRIEF DESCRIPTION OF THE DRAWINGS

The above advantages and features of the present invention will be more apparent from the following detailed description taken conjunction with the drawings in which.

DETAILED DESCRIPTION OF THE PREFERRED EMBODIMENTS

Hereafter, preferred embodiments of the present invention will be elaborated with reference to the figures, throughout which like reference signs are used to designate the same or like components. For the purpose of clarity and conciseness, the detailed description of any known functions and structures incorporated here will be omitted in case that the subject of the present invention might be obscured.

Figure 1:
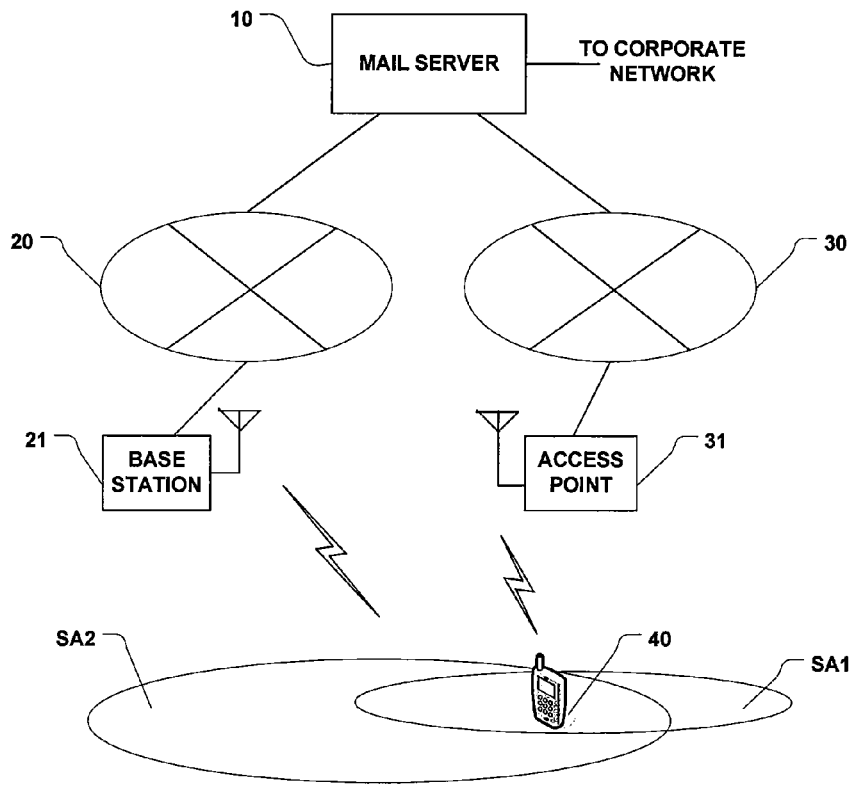
FIG. 1 is an overall schematic diagram of an email pushing system according to an embodiment of the present invention.

FIG. 1 is an overall schematic diagram of an email pushing system according to an embodiment of the present invention.

As shown in FIG. 1, a mail-pushing server 10 acquires corporate emails from a corporate network and stores the emails therein. Then, via WAN 20 and a base station 21 or via LAN 30 and an access point 31, the mail-pushing server 10 sends the corporate email of each user to the mobile terminal 40 carried by the user. Here, WAN 20 is GPRS, CDMA, EDGE, WCDMA, CDMA2000 or TD-SCDMA network, for example. LAN 30 is wired LAN or WIFI/WIMAX/Bluetooth/UWB network, for example.

As seen from FIG. 1, the mail-pushing server 10 is capable of establishing connection with different networks. The base station 21 covers a service area indicated as SA2, and the access point 31 has a service area SA1. The mobile terminal 40 can communicate with the access point 31 in, for example, WIFI mode as well as with the base station 21 in CDMA mode, for example, when the user carrying the mobile terminal 40 enters a region in which the two networks can be access simultaneously.

Figure 2:
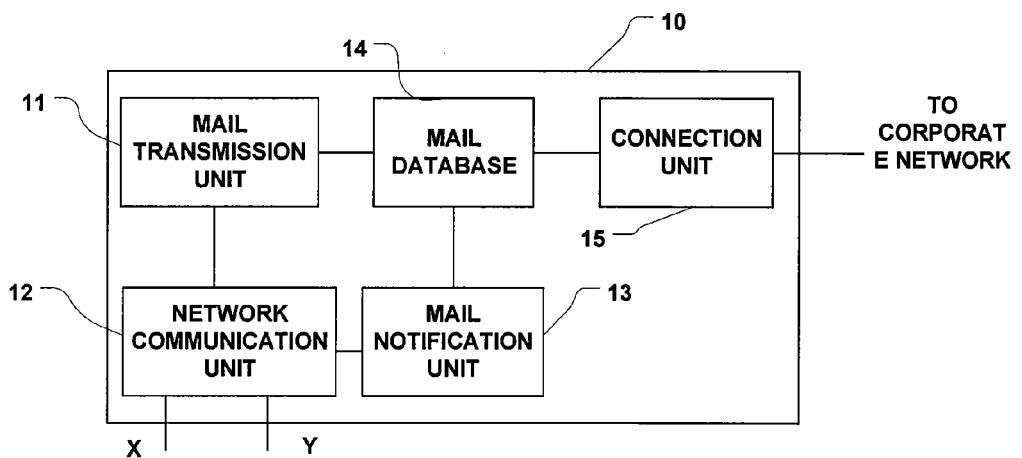
FIG. 2 shows a block diagram of a mail-pushing server as illustrated in FIG. 1.

FIG. 2 shows a block diagram of the mail-pushing server as illustrated in FIG. 1.

As shown in FIG. 2, the mail-pushing server 10 according to the present embodiment comprises a network communication unit 12, a connection unit 15, a mail notification unit 11, a mail transmission unit 13 and a mail database 14.

The network communication unit 12 is utilized to manage various network interfaces, such as WAN interface X and LAN interface Y, verify the network connection request from a mobile terminal and establish network connection with the mobile terminal.

The mail notification unit 13 communicates with the mobile terminal 40 via the network connected by the network communication unit 12, and sends mail notification to the mobile terminal 40 according to the preset mail-pushing protocol and method. In the embodiment of the present invention, the mail notification includes the size of newly-arrived mail, mail type such as encrypted/unencrypted and compressed/uncompressed, pushing manner such as WAP and mail priority.

The connection unit 15 is utilized to communicate with an internal corporate mail server (not shown), translates the mail arrival notification of a mail account into a mail notification message that can be processed by the mail notification unit 13, and obtain the text of the new mail.

The mail database 14 stores the emails retrieved from the corporate mail server, and buffers the email to be pushed until the mail notification unit 13 has received a mail download request from the mobile terminal 40 or when the email hasn't been successfully sent out.

Upon the reception of the mail download request from the mobile terminal 40, the mail transmission unit 11 acquires the new email from the mail database 14 and transmits it to the mobile terminal 40 via the communication network 20 or 30 connected by the network communication unit 12. In addition, the mail transmission unit 11 stores email to be uploaded in the mail database 14 when receiving a mail upload request from the mobile terminal 40.

Figure 3:
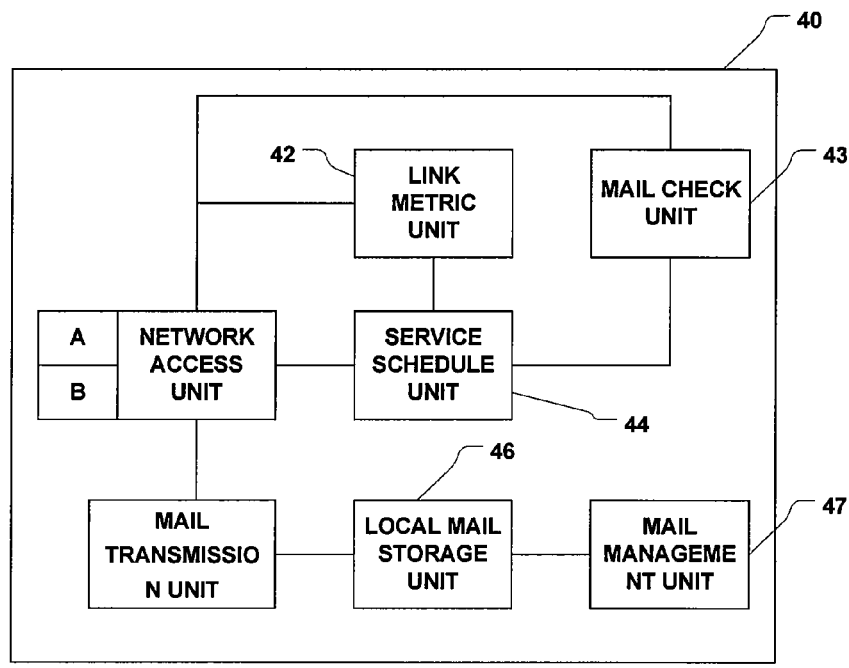
FIG. 3 shows a block diagram of a mobile terminal as illustrated in FIG. 1.

FIG. 3 shows a block diagram of the mobile terminal as illustrated in FIG. 1.

As shown in FIG. 3, the mobile terminal 40 of the present embodiment comprises a network access unit 41, a link metric unit 42, a service schedule unit 44, a mail check unit 43, a local mail storage unit 46, a mail management unit 47 and a mail transmission unit 45.

The network access unit 41 is utilized to manage different network interfaces, such as setting various operating statuses including modes of standby, closedown, low power consumption and normal operation for network interfaces, such as WAN interface A and LAN interface B, to establish network connection and to set network operating modes, for example, the operating mode of CLASS 8/10/12 used in GPRS mode and corresponding up- and down-channel slots, the transmission rate, encryption scheme for the link layer and authentication mode in WIFI mode, and so on.

The link metric unit 42 is utilized to, at the time of data transmission, measure various parameters of certain network interface, such as data transmission rate, type of data transmission protocol, data packet loss ratio, turnover period and authentication overhead.

The service schedule unit 44 is utilized to calculate the unit power consumption for each network interface based on the parameters provided by the link metric unit 42 and the current network operating mode, to update the effective length threshold for a mail from the calculated effective transmission power consumption, and to decide via which network interface the mail is retrieved.

The mail check unit 43 is utilized to communicate with the mail-pushing server and obtain the arrival notification of new mail via the network connected by the network access unit 41. The notification contains information such as the size, type and priority of the new mail, as mention previously.

The local mail storage unit 46 is utilized to store emails received by the mail transmission unit 45 as well as emails created locally by the user.

The mail management unit 47 is utilized to manage emails stored in the local mail storage unit 46.

The mail transmission unit 45 is utilized to establish connection with the mail-pushing server 10 and to acquire new mail from the network interface specified by the service schedule unit 44, such as WAN interface A or LAN interface B. Further, the mail transmission unit 45 uploads the emails created in the local mail storage unit 46 to the mail-pushing server 10 based on the upload request sent by the user.

At the mobile terminal 40, LAN interface (wired LAN, WIFI/WIMAX/Bluetooth/UWB) B is normally closed, while WAN interface (GPRS, CDMA, EDGE, WCDMA, CDMA2000, TD-SCDMA) A is kept in the standby status and waiting for the mail notification sent by the mail-pushing server.

The mobile terminal 40 can also in advance calculate the unit transmission power consumption for each wireless network based on hardware specifications and compute bandwidth utilization ratio according to relevant network transmission protocols. Then, one initial data transmission threshold can be calculated from the bandwidth utilization ratio and the unit transmission power consumption of the wireless network.

The data transmission rate is high in WIFI mode. As an example, the theoretical peak rate can reach 11 Mbps in 802.11b mode and can be up to 54 Mbps in 802.11g mode. On the other hand, the theoretical rate of WAN connection is only below 100 Kbps for GPRS and less than 200 Kbps for CDMA. Even in the age of 3G, the theoretical rate for EDGE link can just attain to 384 Kbps. As explained above, the standby power consumption is too high in WIFI mode to maintain link connection status for a long time. Further, it will take considerable amount of connection time and additional connection overhead to complete a series of operations, such as device resetting, security authentication for link and network layers, when WIFI connection is established for the first time. As a result, the bandwidth utilization ratio is low in the case of a small amount of data.

Generally speaking, the unit transmission power consumption is lower and the bandwidth utilization ratio is higher for WIFI when the transmitted data is of larger amount, given consideration to network authentication overhead and load on the link layer. On the contrary, the unit transmission power consumption is lower and the bandwidth utilization ratio is higher for WAN interface when the transmitted data is of smaller amount. Therefore, an effective length threshold can be computed from these parameters, with WAN interface being selected to achieve a higher transmission efficient if mail size is less than the threshold, and WIFI interface being selected if mail size is greater than the threshold.

Figure 4:
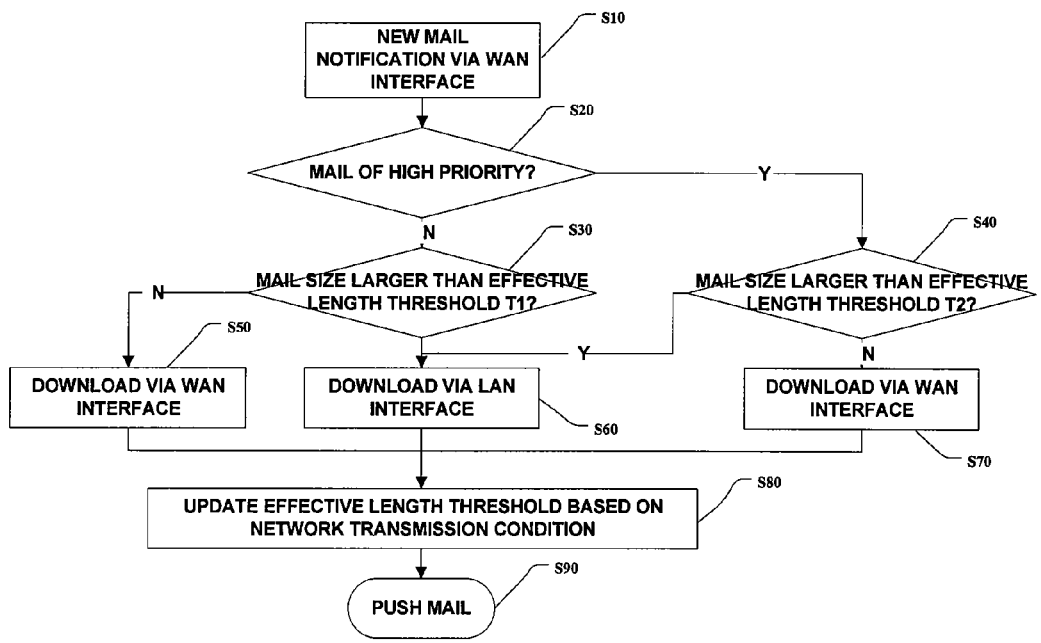
FIG. 4 is a flowchart of an email pushing method according to an embodiment of the present invention.

FIG. 4 is a flowchart of an email pushing method according to the embodiment of the present invention.

As described above, when no data transmission occurs, the mobile terminal 40 calculates the theoretical unit power consumption for each network interface base on hardware specifications and network protocol and presets one initial transmission threshold empirically.

As shown in FIG. 4, in step S10, a new mail notification is sent from the mail-pushing server 10 and received via WAN interface A, and the notification includes information about the size, type, pushing manner and priority of the new mail.

The priority of the new mail is determined in step S20.

If the new mail is a general email, it is determined in step S30 whether the size of the mail is larger than the preset effective length threshold T1. Here, the effective length threshold T1 is calculated by the service schedule unit 44 according to the following equation:

$$T1 = R1*R2*(P1*C2 - P2*C1)/(P1*P2*(P1*R2 - P2*R)) \quad (1)$$

where P1, C1 and R1 represent the unit power consumption, the authentication overhead and the network transmission efficiency of LAN interface, respectively, while P2, C2 and R2 represent the unit power consumption, the authentication overhead and the network transmission efficiency of WAN interface, respectively. The above P1, C1, R1, P2, C2 and R2 are all provided by the link metric unit 42.

A corresponding manipulation strategy, such as time priority strategy, can be employed if the new mail is email with high priority. Meanwhile, only network authentication overhead and network transmission efficient are taken into account in calculation of transmission threshold. From the two parameters, the service schedule unit 44 can compute an effective length threshold T2 using the equation as follows:

$$T2 = (R1*C2 - R2*C1)/(R2 - R1) \quad (2)$$

Next, it is determined as to whether the size of the new mail is greater than the effective length threshold T2 in step S40, and the mail transmission unit 45 will download the email via WAN interface A in step S70 if the mail size is not greater than the threshold T2.

If the size of the email is larger than the effective length threshold T2, the service schedule unit 44 determines to download the email via LAN interface B.

If the answer in step S30 is NO, that is, the size of the general mail is larger than the effective length threshold T1, the service schedule unit 44 determines to download the email via WAN interface A.

Further, to make the effective length thresholds more accurate at the time of actually pushing mail, if no mail transmission has yet occurred and the mail size is larger than some predefined threshold, the mobile terminal 40 can initiatively send a group of test data packets to the mail-pushing server 10 before the real start of mail transmission. Having received the test data packets, the mail-pushing server 10 can calculate the effective length thresholds T1 and T2 for the mobile terminal 40.

After data transmission occurs, the link metric unit 42 of the mobile terminal 40 retrieves parameters, such as the actual network transmission efficient, packet loss ratio and turnover period from TCP/IP protocol stack, update the unit power consumption $P1_{NEW}$ and $P2_{NEW}$ of the network interfaces with the latest parameters, and further calculate the unit power consumption and transmission efficient for the networks under the new transmission condition. In this way, the service schedule unit 44 in step S80 recalculates the new effective length thresholds $T1_{NEW}$ and $T2_{NEW}$ on the basis of the new unit power consumption for the network interfaces given by the link metric unit 42. The following equations show how to calculate the unit power consumption $P1_{NEW}$ and $P2_{NEW}$ of the network interfaces during real transmission.

$$P1_{NEW}=P0*R0/(R1_{NEW}*L1_{NEW}) \quad (3)$$

$$P2_{NEW}=P0*R0/(R2_{NEW}*L2_{NEW}) \quad (4)$$

where P0 and R0 represent the theoretical unit power consumption and network transmission efficiency for the network interfaces A and B, respectively, $R1_{NEW}$ and $R2_{NEW}$ represent the actual network transmission efficiency for the network interfaces A and B, respectively, and $L1_{NEW}$ and $L2_{NEW}$ represent the actual packet loss ratio for the network interfaces A and B, respectively.

When the user issues to the mail-pushing server 10 a command for pushing email over LAN in the case of downloading email over LAN, the service schedule unit 44 instructs the network access unit 41 to set WAN interface A into the standby status and open LAN interface B. The mail transmission unit 45 then downloads the email via LAN interface B.

When the user issues to the mail-pushing server 10 a command for pushing email over WAN in the case of downloading email over WAN, the mail transmission unit 45 downloads the email via WAN interface A.

The mobile terminal 40 opens LAN interface B, configures its operating parameters and completes the download of the mail text via LAN interface B if the mail size is larger than the predifined threshold T1, otherwise, the download is performed via WAN interface A. Following the completion of mail download, WAN interface A will be set as standby and LAN interface B will be closed if no mail newly arrives.

The above discloses only the preferred embodiments of the present invention and has no intention to limit the scope of the present invention. Any variation or substitution that can be readily envisaged by those skilled in the art should be encompassed in the scope of the invention, which is therefore defined by the appended claims.

What is claimed is:

1. A method for pushing email in heterogeneous networks, comprising the steps of:
    sending a mail notification including at least mail priority and mail size of the email from a mail-pushing server to a mobile terminal;
    determining, by the mobile terminal, a download strategy for the email based on at least one predefined threshold, said mail priority and said mail size; and
    downloading said email from the mail-pushing server based on the determined download strategy;
    wherein said step of determining comprises:
        if said mail priority is low, comparing said mail size with a first predefined threshold; determining to download said email via a WAN interface if said mail size is larger than said first predefined threshold; and determining to download said email via a LAN interface if said mail size is not larger than said first predefined threshold,
        if said mail priority is high, comparing said mail size with a second predefined threshold; determining to download said email via the LAN interface if said mail size is larger than said second predefined threshold; and determining to download said email via the WAN interface if said mail size is not larger than said second predefined threshold,
    the first predetermined threshold T1 is calculated as follows:

$$T1=R1*R2*(P1*C2-P2*C1)/(P1*P2*(P1*R2-P2*R1)),$$

the second predetermined threshold T2 is calculated as follows:

$$T2=(R1*C2-R2*C1)/(R2-R1),$$

where P1, C1 and R1 represent the unit power consumption, the authentication overhead and the network transmission efficiency of LAN interface, respectively, while P2, C2 and R2 represent the unit power consumption, the authentication overhead and the network transmission efficiency of WAN interface, respectively.

2. The method of claim 1, further comprising a step of updating said first predefined threshold and/or said second predefined threshold based on the actual characteristics of network transmission.

3. The method of claim 2, wherein said step of updating comprises:
    determining the actual unit transmission power consumption of each network interface based on the actual transmission rate and actual packet loss ratio of the corresponding network interface; and
    updating said first predefined threshold and/or said second predefined threshold based on said actual unit transmission power consumption, said actual transmission rate and authentication overhead of each network interface.

4. The method of claim 2, wherein said mail notification further includes mail-pushing manner and mail type.

5. The method of claim 1, wherein said WAN interface is GPRS, CDMA, EDGE, WCDMA, CDMA2000, or TD-SCDMA interface, and said LAN interface is wired LAN, WIFI, WIMAX, Bluetooth or UWB interface.

6. The method of claim 1, wherein said WAN interface is opened, while said LAN interface is closed.

7. A mobile terminal comprising:
    network access means having at least two network interfaces for accessing at least two types of networks;
    link metric means for calculating the unit transmission power consumption, authentication overhead and network transmission efficiency of the network accessed by the network access means;
    service schedule means for calculating at least one predefined threshold based on said unit transmission power consumption, authentication overhead and network transmission efficiency; and
    mail check means for receiving a mail notification including at least mail priority and mail size from a mail-pushing server,
    wherein said service schedule means determines a download strategy for said email based on said mail priority, said mail size and said at least one predefined threshold and downloads said email based on said download strategy,
    if said mail priority is low, said service schedule means compares said mail size with a first predefined threshold, determines to download said email via a first network interface if said mail size is larger than said first predefined threshold, and determines to download said email via a second network interface if said mail size is not larger than said first predefined threshold, if said mail priority is high, said service schedule means compares said mail size with a second predefined threshold, determines to download said email via the second network interface if said mail size is larger than said second predefined threshold, and determines to download said email via the first network interface if said mail size is not larger than said second predefined threshold, the first predetermined threshold T1 is calculated as follows:

$$T1=R1*R2*(P1*C2-P2*C1)/(P1*P2*(P1*R2-P2*R1)),$$

the second predetermined threshold T2 is calculated as follows:

$$T2=(R1*C2-R2*C1)/(R2-R1),$$

where P1, C1 and R1 represent the unit power consumption, the authentication overhead and the network transmission efficiency of LAN interface, respectively, while P2, C2 and R2 represent the unit power consumption, the authentication overhead and the network transmission efficiency of WAN interface, respectively.

8. The mobile terminal of claim 7, wherein said service schedule means updates said first predefined threshold and/or said second predefined threshold based on the actual characteristics of network transmission.

9. The mobile terminal of claim 8, wherein said link metric means determines the actual unit transmission power consumption of each network interface based on the actual transmission rate and actual packet loss ratio of the corresponding network interface, and said service schedule means updates said first predefined threshold and/or said second predefined threshold based on said actual unit transmission power consumption, said actual transmission rate and authentication overhead of each network interface.

10. The mobile terminal of claim 8, wherein said mail notification further includes mail-pushing manner and mail type.

11. The mobile terminal of claim 7, wherein said WAN interface is GPRS, CDMA, EDGE, WCDMA, CDMA2000, or TD-SCDMA interface, and said LAN interface is wired LAN, WIFI, WIMAX, Bluetooth or UWB interface.

12. A mail system comprising at least one mobile terminal of claim 7.

13. A method on a mobile terminal in heterogeneous networks, comprising the steps of the mobile terminal:
   receiving a mail notification including at least mail priority and mail size of the email from a mail-pushing server;
   determining a download strategy for the email based on at least one predefined threshold, said mail priority and said mail size; and
   downloading said email from the mail-pushing server based on the determined download strategy;
   wherein said step of determining comprises:
   if said mail priority is low, comparing said mail size with a first predefined threshold; determining to download said email via a WAN interface if said mail size is larger than said first predefined threshold; and determining to download said email via a LAN interface if said mail size is not larger than said first predefined threshold,
   if said mail priority is high, comparing said mail size with a second predefined threshold; determining to download said email via the LAN interface if said mail size is larger than said second predefined threshold; and determining to download said email via the WAN interface if said mail size is not larger than said second predefined threshold,
   the first predetermined threshold T1 is calculated as follows:

$$T1=R1*R2*(P1*C2-P2*C1)/(P1*P2*(P1*R2-P2*R1)),$$

the second predetermined threshold T2 is calculated as follows:

$$T2=(R1*C2-R2*C1)/(R2-R1),$$

where P1, C1 and R1 represent the unit power consumption, the authentication overhead and the network transmission efficiency of LAN interface, respectively, while P2, C2 and R2 represent the unit power consumption, the authentication overhead and the network transmission efficiency of WAN interface, respectively.

* * * * *